Nov. 13, 1928.
S. J. STRID
1,691,893
SAFETY LOCK
Filed Sept. 10, 1926
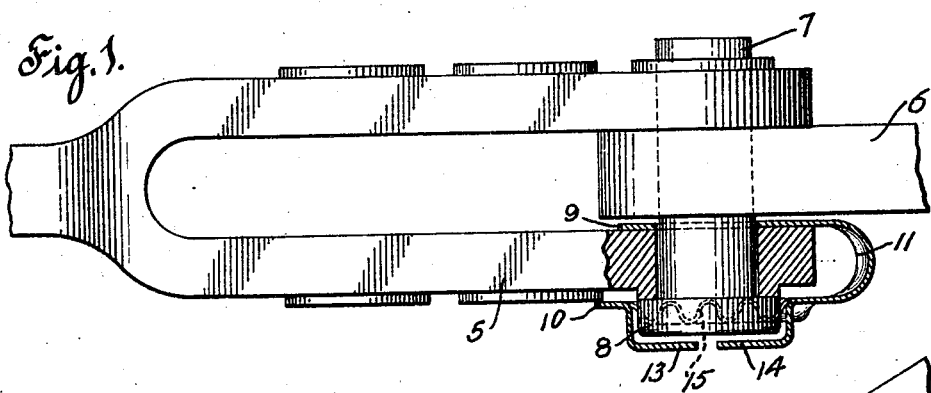
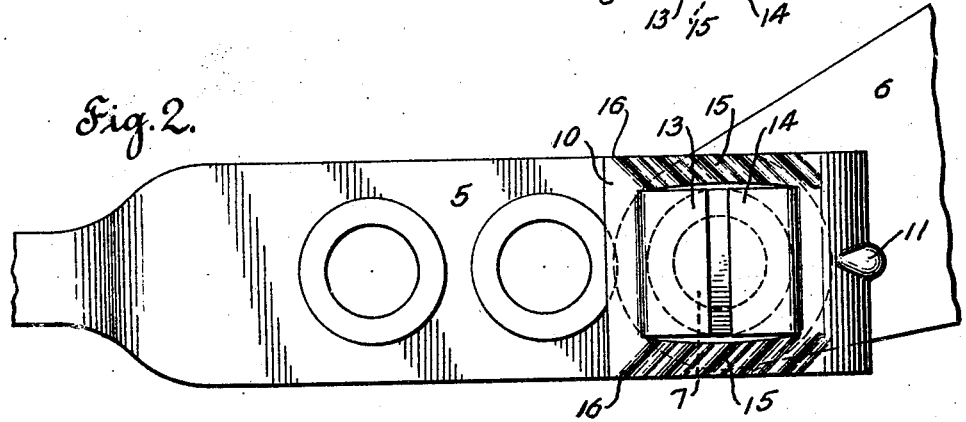
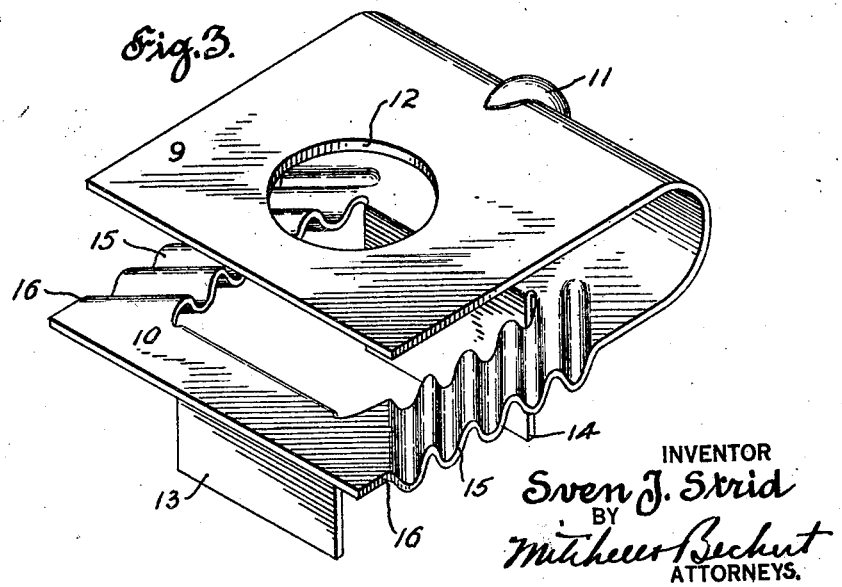
INVENTOR
Sven J. Strid
BY
Mitchell Bechut
ATTORNEYS.

Patented Nov. 13, 1928.

1,691,893

UNITED STATES PATENT OFFICE.

SVEN J. STRID, OF CHICAGO, ILLINOIS, ASSIGNOR, BY MESNE ASSIGNMENTS, TO E. PAYSON SMITH, OF CHICAGO, ILLINOIS.

SAFETY LOCK.

Application filed September 10, 1926. Serial No. 134,618.

My invention relates to a pin lock particularly adapted for holding a pin in place on railway car brake mechanism.

It is the principal object of the invention to provide an improved, simple, reliable and cheap form of lock for preventing the accidental withdrawal of a pin.

In the drawings which show, for illustrative purposes only, a preferred form of the invention—

Fig. 1 is a fragmentary view of railway car brake mechanism illustrating the improved form of pin lock in section;

Fig. 2 is a view similar to Fig. 1 but viewed at right angles thereto;

Fig. 3 is an enlarged perspective view of the pin lock shown in Figs. 1 and 2.

In said drawings, 5—6 indicate two members of railway car brake mechanism, pivotally connected together by means of a pin 7, preferably having a head 8 at one end. My improved pin lock is adapted to secure the pin 7 in place so as to prevent accidental falling out of the pin with consequent disastrous results to the brake mechanism.

In the preferred form, the pin lock comprises a sheet metal member bent into substantially U-form, thus providing legs 9—10. If desired, the member may have a rib 11 at the bend of the U for strengthening the member and preventing the legs of relatively thin sheet metal from spreading. The leg 9, if desired, may be of substantially the same length as the leg 10, and if so is provided with an opening 12 of a size to receive the shank of the pin 7. The leg 10 has one or more bendable tongues 13—14 thereon and, in the preferred form, these tongues are formed by slitting the leg 10 longitudinally and striking up the metal between the slits, so as to form the two opposed bendable tongues integral with the leg.

The webs or connecting portions at the sides of the slits are preferably corrugated diagonally and at oppositely inclined angles relatively to a median line, as indicated at 15—15, and the corrugations preferably extend substantially up to the free end of the leg 10, as indicated at 16—16. The slot or opening formed by slitting the metal and striking up the tongue or tongues is preferably of a size to receive the pin head 8, and by making the slot relatively long, correspondingly long tongues 13—14 will be provided. The diagonal corrugations serve to shorten the webs and bring the tongues 13—14 closer together thus, in effect, providing longer tongues to be bent down over the pin head 8, as clearly shown in Figs. 1 and 2. Without the stiffening corrugations the metal forming the relatively narrow webs would tend to bend so as to curl up or raise the extreme end of the leg 10 when the tongue 13 is hammered or bent down over the pin head 8. The corrugations extending substantially up to the end of the leg 10, that is, outwardly beyond base of the tongue 13, effectively prevent bending of the webs when the tongue 13 is bent down. The corrugations have an added advantage in that the pin head 8 abuts against the edges of the corrugations, and the metal constituting the webs is thus prevented from slipping beneath the head 8 and thus displacing the pin lock sidewise.

The pin lock may be applied as follows:

The U-shaped member, with the tongues extending as shown in Fig. 3, is slipped over the fork arm 5 and the pin 7 then passed through the slot in the leg 10 and through the aperture 12 (when the leg 9 is sufficiently long and such aperture is provided). The upstanding tongues 13—14 may then be bent down into the position shown in Figs. 1 and 2. The pin 7 is thus effectually prevented from accidentally working loose. Should one of the tongues be broken off or be accidentally bent up, the other tongue may still serve to hold the pin in place.

While the invention has been described in detail, I do not wish to be strictly limited to the form shown, since changes may be made within the scope of the invention as defined in the appended claims.

I claim:

1. A pin lock including a sheet metal member of substantially U-form, one leg of the U having an aperture therein for the passage of the pin, the other leg having a slot therein with the metal within said slot struck up to form two bendable tongues integral with said leg at opposite edges of said slot, the metal defining said slot and lying between said tongues having diagonally extending corrugations therein extending substantially past said tongue at the end of the leg of said U.

2. A pin lock comprising a sheet metal member having a slot therein and the metal within said slot struck up to form an integral bendable tongue, the metal defining said slot at opposite sides being corrugated diagonally to foreshorten said member and stiffen the side walls against longitudinal bending.

3. A pin lock comprising a sheet metal member having two bendable tongues thereon adjacent the ends of said member, and having an opening inwardly of and adjacent said bendable tongues, the metal adjacent the sides of said opening and between said tongues being corrugated, and the corrugations extending diagonally to foreshorten the sides of said member.

S. J. STRID.